United States Patent [19]
Zoccoletti et al.

[11] Patent Number: 5,267,468
[45] Date of Patent: Dec. 7, 1993

[54] MACHINE FOR AIR SEAL TESTS ON CART WHEEL RIMS

[76] Inventors: Giancarlo Zoccoletti, 6 via Bosco Di Sacco, Campolongo Maggiore, Italy, 30010; Enrico Dinon, 67 via Canova, Preganziol, Italy, 31022

[21] Appl. No.: 897,840

[22] Filed: Jun. 12, 1992

[30] Foreign Application Priority Data

Jun. 21, 1991 [IT] Italy ................ PD91 A 000113

[51] Int. Cl.⁵ .................................... G01M 3/26
[52] U.S. Cl. ............................................ 73/40
[58] Field of Search ........................... 73/40, 40.7

[56] References Cited

U.S. PATENT DOCUMENTS

| | | | |
|---|---|---|---|
| 3,266,296 | 8/1966 | Hall | 73/40 |
| 3,721,117 | 3/1973 | Ford et al. | 73/40.7 |
| 4,754,638 | 7/1988 | Brayman et al. | 73/40.7 |
| 4,813,268 | 3/1989 | Helvey | 73/40.7 |
| 4,991,426 | 2/1991 | Evans | 73/40 X |
| 5,010,761 | 4/1991 | Cohen et al. | 73/40.7 |

FOREIGN PATENT DOCUMENTS

| | | | |
|---|---|---|---|
| 3421258 | 8/1985 | Fed. Rep. of Germany | 73/40 |
| 36745 | 3/1980 | Japan | 73/40.7 |
| 17336 | 2/1983 | Japan | 73/40.7 |
| 291138 | 11/1989 | Japan | 73/40 |
| 2000300 | 1/1979 | United Kingdom | 73/40.7 |

*Primary Examiner*—Hezron E. Williams
*Assistant Examiner*—Joseph W. Roskos
*Attorney, Agent, or Firm*—Dowell & Dowell

[57] ABSTRACT

A machine for testing for air seal leaks in wheel rims which includes closure members for enclosing the inner chamber defined by the wheel hub and an outer casing which surrounds the closure members and into which a fluid is introduced under pressure. A liquid circuit is provided for initially filling the inner chamber with an incompressible liquid and a detection device communicates with the circuit to measure increases in pressures resulting from fluid leaking into the inner chamber during testing.

9 Claims, 2 Drawing Sheets

MACHINE FOR AIR SEAL TESTS ON CART WHEEL RIMS

BACKGROUND OF THE INVENTION

1. Field of the Invention

A machine for carrying out air seal tests on wheel rims for vehicles. The machine checks possible porosities, which can be passing, diffused or situated in walls of the wheel rims obtained by casting.

2. History of the Related Art

Up to now, the tests for seal of the wheel rims for vehicles obtained by casting, to be used on wheels without an inner tube (tubeless), have been carried out following two different principles. In both, the inner volume of the rim was isolated from the environment, by means of special sealing surfaces. The set, including the rim and sealing surfaces, was introduced into a water volume, and air, at a volume of high pressure, was let into the inner volume defined by the rim. Therefore, it was possible to verify the presence of possible small bubbles indicating the incorrect seal of the rim's walls. The inconveniences of this system are based on the fact that the inspection was entrusted to a controller, and further, that is was not possible to quantify the value of the loss and the pressure is exerted in a sense opposite to the normal operation pressure which is from the outer area of the rim. Another inspection system consists in introducing gas, at a high pressure, into a chamber exterior to the rim and then inspecting the possible variation of gas pressure in the inner isolated chamber of the rim. This system presents the problem of the difficult identification of the pressure variation in the inner chamber, which is very limited, because of the considerable volume of the inner chamber.

SUMMARY OF THE INVENTION

In order to solve these problems, a new method and new equipment for the air seal test on wheel rims for vehicles, have been studied.

The wheel rim is basically composed of a cylinder with edges, spokes and the central hub.

Two opposed sealing surfaces are placed on the cylinder's edges, so as to create a volume, which is called inner volume, defined by the cylinder and by the opposed surfaces. The inner volume is filled with liquid and is introduced in a pressure chamber. By increasing the pressure external to the rim, the possible passage of gas through the cylinder's walls produces a sudden increase in the pressure of the incompressible liquid, which is detectable by a differential gauge, giving values that can be correlated to the amount of the loss.

Furthermore, by keeping a constant column of liquid above the gauge insertion point, a preloading value is determined on the same gauge. In this way, the promptness of the test results is increased and both the uniformity of the initial data and the repeatability of the test results are guaranteed.

The equipment is composed, in its essential parts, of two plates (higher and lower) provided with gaskets, in such a way as to guarantee a sealing contact between the plates and the cylinder's edges of the wheel rim. On the higher plate a conduit with an overflow at a constant height and with a sealing valve below is connected. A liquid pressure transducer (differential gauge) is placed under this sealing valve.

On the lower plate a conduit with a valve is connected in which liquid contained in a tank comes from. The tank is placed at a heigher position than the overflow. In this way, the liquid loading into the inner chamber is naturally obtained by gravity.

The set described is, in its turn, contained in an airtight chamber, in which it is possible, with special conduits, to bring the pressure of a test gas to higher values than the operation pressure of the wheel rim.

DESCRIPTION OF THE PREFERRED EMBODIMENT

By way of a non-limitative example and with reference to the attached drawing, a practical example of execution of the invention is described.

Figure 1:
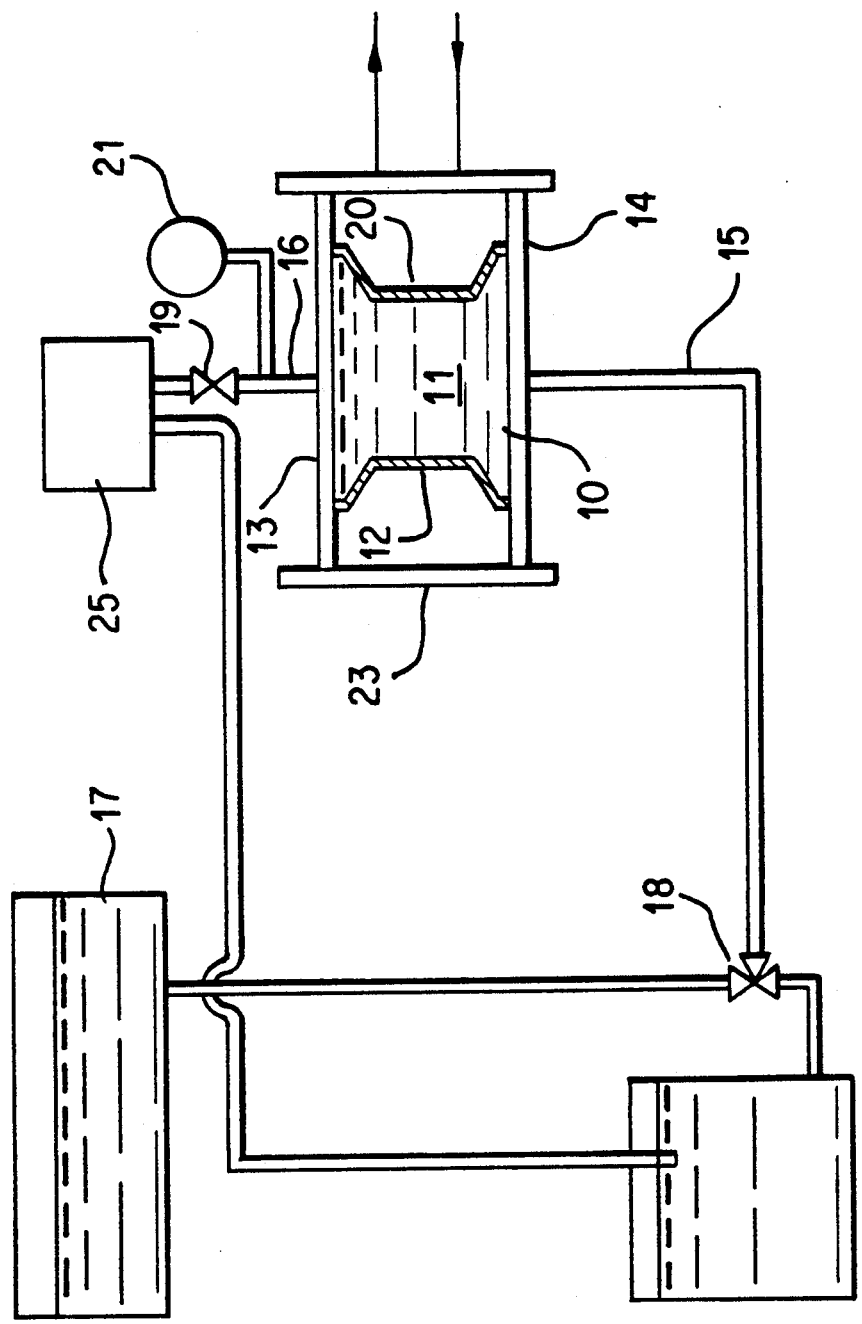
FIG. 1 is a schematic diagram showing a wheel rim test set in relationship to a circuit for introducing liquid into the inner chamber of the rim and a fluid circuit for pressuring the space surrounding the rim.

The working diagram of the invention is represented in FIG. 1, where the following parts are shown: the rim (10), the inner liquid-saturated volume (11), the cylinder's walls (12), the surfaces of higher (13) and lower (14) closing, the loading (15) and overflow (16) conduits, the liquid tank (17), the valves (18 and 19), the airtight chamber (20) and the differential gauge (21).

Figure 2:
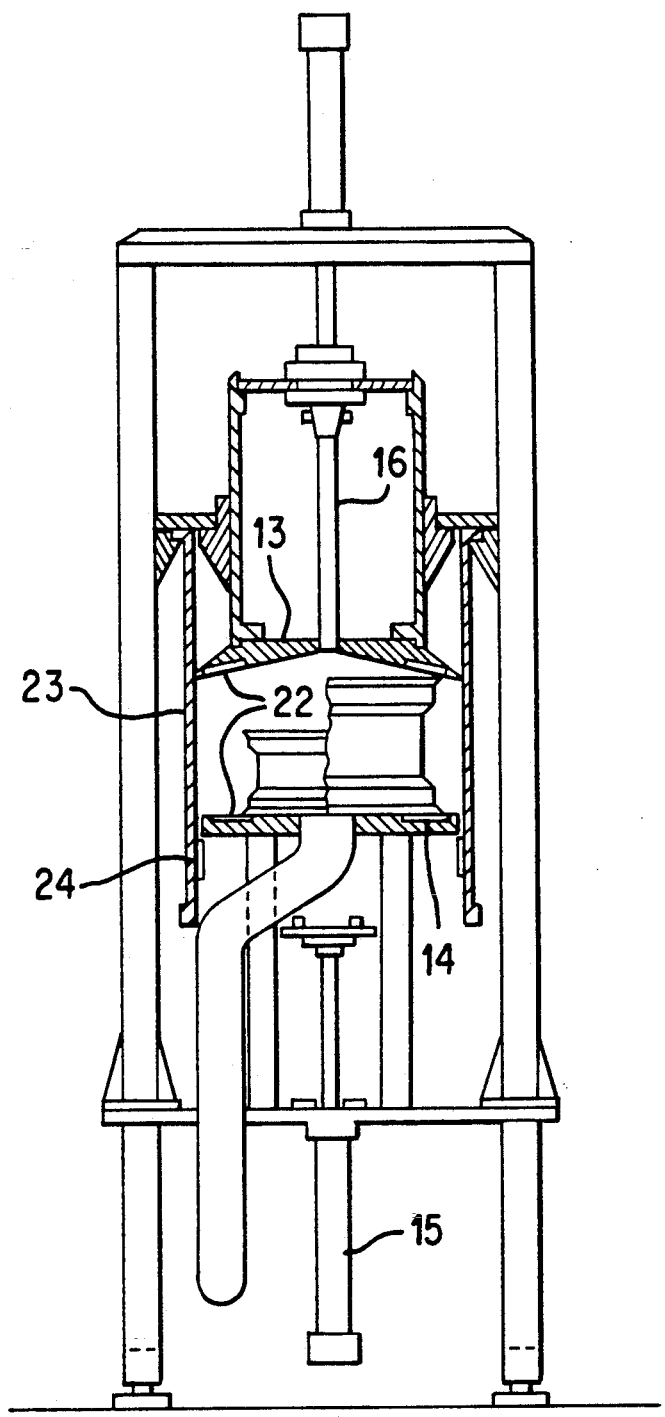
FIG. 2 is a partial cross-sectional front plan view of a testing machine in accordance with the teachings of the present invention.

In FIG. 2, a preferred constructional model is represented.

The higher (13) and lower (14) surfaces are provided with gaskets (22); in particular, the higher surface (13) has a truncated-cone shape and is vertically moveable. In this way, it can position the rim and can check rims of different diameters and length. The two surfaces (13, 14) are connected to the special loading (15) and overflow (16) conduits.

The airtight chamber (20) is partly obtained by the higher (13) and lower (14) surfaces and by a cylinder (23) that slides vertically on the external edges of the surfaces (14, 15), suitably provided with gaskets (24). Just above the higher surface (13), a chamber (25) is placed for the recovery of the liquid overflowing from the overflow conduit (16), during the filling of the inner volume of the rim (10).

These are the schematic modalities sufficient to the skilled person to carry out the invention. As a consequence, in the real application there could be some changes, without prejudice to the substance of the innovative concept. Therefore, with reference to the above-mentioned description and to the attached drawings, we express the following

We claim:

1. A machine for testing for air seal leaks in the rims of vehicle wheels wherein the wheels include hubs having opposite side edges and wherein the wheels have an inner chamber defined within the hubs, the machine comprising; a pair of opposing sealing means for engaging the opposite side edges of the wheel rim so as to seal the inner chamber with respect to the surrounding environment, a liquid circuit means for supplying an incompressible liquid into the inner chamber, means for supplying fluid under pressure into the surrounding environment of the wheel rim and said opposing sealing means, and detection means for detecting pressure leaks of said fluid into the inner chamber.

2. The machine of claim 1, including means for selectively adjusting the spacing between said sealing means to thereby allow for the testing of varying sizes of wheel rims.

3. The machine of claim 2, including an enclosure means for surrounding said opposing sealing means and the wheel rim so as to define a pressure chamber therebetween, and said means for supplying fluid under pressure including means for introducing fluid into said pressure chamber.

4. The machine of claim 1, including an enclosure means for surrounding said opposing sealing means and the wheel rim so as to define a pressure chamber therebetween, and said means for supplying fluid under pressure including means for introducing fluid into said pressure chamber.

5. The machine of claim 4, in which said liquid circuit means includes a tank, first fluid conduit for connecting said tank through one of said opposing sealing means so as to communicate said tank with said inner chamber, and a second fluid conduit extending from the other of said opposing sealing means through which liquid overflow from said inner chamber is received.

6. The machine of claim 1, in which said liquid circuit means includes a tank, first fluid conduit for connecting said tank through one of said opposing sealing means so as to communicate said tank with said inner chamber, and a second fluid conduit extending from the other of said opposing sealing means through which liquid overflow from said inner chamber is received.

7. The machine of claim 5, including valve means disposed along each of said first and second conduits for isolating the liquid within said inner chamber, and said detection means including means for detecting pressure within said second conduit between said inner chamber and said valve means.

8. The machine of claim 6, including valve means disposed along each of said first and second conduits for isolating the liquid within said inner chamber, and said detection means including means for detecting pressure within said second conduit between said inner chamber and said valve means.

9. The machine of the claim 8, in which said tank is elevated with respect to said inner chamber whereby liquid from said tank is supplied through said first conduit by gravity.

* * * * *